United States Patent [19]

Randolph

[11] Patent Number: 5,814,678
[45] Date of Patent: Sep. 29, 1998

[54] CHEMICAL REACTIONS IN WATER-IN-CARBON DIOXIDE MICROEMULSIONS AND CONTROL THEREOF

[75] Inventor: Theodore W. Randolph, Niwot, Colo.

[73] Assignee: University Technology Corp., Boulder, Colo.

[21] Appl. No.: 792,517

[22] Filed: Jan. 31, 1997

[51] Int. Cl.⁶ ...................................................... C08F 2/46
[52] U.S. Cl. ............................... 522/18; 522/20; 522/23; 526/89; 526/216; 526/309; 423/610
[58] Field of Search ............................ 526/89, 216, 309; 522/18, 20, 23; 423/610

[56] References Cited

U.S. PATENT DOCUMENTS

| | | | |
|---|---|---|---|
| 4,925,790 | 5/1990 | Blanch et al. | 435/52 |
| 5,266,205 | 11/1993 | Fulton et al. | |
| 5,312,882 | 5/1994 | DeSimone et al. | |
| 5,514,759 | 5/1996 | DeSimone et al. | 526/89 |

OTHER PUBLICATIONS

Eckert, C.A. et al. (1996) *Nature* 383:313–318.
Hoefling, T.A. et al (1991) *J. Phys. Chem.* 95:7127–7129.
DeSimone, J.M. et al. (1994) *Science* 265:356–359.
Johnston, K.P. et al. (1996) *Science* 271:624–626.
DeSimone, J.M. et al. (1992) *Science* 257:945–947.
Randolph and Carlier (1992) *J. Phys. Chem.* 96:5146–5151.

*Primary Examiner*—Joseph L. Schofer
*Assistant Examiner*—N. Sarofin
*Attorney, Agent, or Firm*—Greenlee, Winner and Sullivan, PC

[57] ABSTRACT

The present invention provides for the regulation of the rate of a chemical reaction within the aqueous micelles within a microemulsion of water in supercritical carbon dioxide. Increase in pressure increases the concentration of an ionized reaction component (reactant, catalyst or reaction initiator) within the reverse micelles, thus increasing the rate of the reaction or allowing the reaction to initiate. Similarly, the reaction rate can be slowed by decreasing the pressure, thus decreasing the amount of water and ionized components in the reverse micelles. Decrease in the pressure below a critical level results in the reaction stopping when the concentration of a ionized reaction component falls to a sufficiently low level. Advantages of the present methods of regulating reactions in microemulsions in supercritical carbon dioxide include the speed with which pressure can be changed, the potential for the production of very small and uniform particles (reaction products, such as from polymerization reactions) and the nontoxic nature of the water and carbon dioxide portions of the microemulsions.

14 Claims, 5 Drawing Sheets

CHEMICAL REACTIONS IN WATER-IN-CARBON DIOXIDE MICROEMULSIONS AND CONTROL THEREOF

ACKNOWLEDGEMENT OF FEDERAL RESEARCH SUPPORT

The present invention was funded, at least in part, by the National Science Foundation (#CTS-9414759). Accordingly, the United States Government may have certain rights in this invention.

CROSS-REFERENCE TO RELATED APPLICATION

This application takes priority from United States provisional patent application Ser. No. 60/010,602, filed Feb. 2, 1996.

BACKGROUND OF THE INVENTION

The field of the present invention is in the area of the regulation of chemical reactions carried out in supercritical fluids and emulsions of same, especially where reactions are controlled by regulating the pressure in the reaction environment.

The ability to design surfactants for the interface between water and $CO_2$ offers new opportunities in protein and polymer chemistry, separation science, reaction engineering, environmental science for waste minimization and treatment, and materials science. Supercritical $CO_2$ ($T_c=31°$ C. and $P_c=73.8$ bar) is a useful replacement for organic solvents to minimize waste and reduce volatile organic carbon (VOC) emissions. Not only is $CO_2$ more environmentally acceptable and naturally abundant than organic solvents, it is nonflammable, essentially nontoxic, and the least expensive solvent besides water. Practical applications include extraction of caffeine from coffee, homogeneous (1) and heterogeneous (2,3) polymerization, production of sub-micrometer particles and fibers (4), spray painting and coating, and utilization as a feedback to synthesize various organic substances (5).

The present invention enables making $CO_2$ accessible to proteins and other nonvolatile hydrophilic substances, especially ionizable hydrophilic compounds, producing water-in-$CO_2$ microemulsions that consist of thermodynamically stable and potentially optically transparent aqueous domains. These polar, aqueous domains can solubilize proteins, bovine serum albumin (BSA), as specifically exemplified herein.

BRIEF DESCRIPTION OF THE DRAWINGS

FIG. 3B also provides spectra for native BSA-Ac (——) and BSA-Ac encapsulated in an AOT water-in-oil microemulsion at $W_0=20$ (___).

SUMMARY OF THE INVENTION

At the heart of the present invention is the discovery that the pressure-dependent nature of the water core within the micelles of a microemulsion of water (or an aqueous solution) in supercritical $CO_2$ can be employed as a switch to turn reactions on and off using pressure. At sufficiently high pressure, there is a sufficient amount of water present in the core to allow the ionization of a reaction component therein. The ionizable component can be a reactant, a catalyst, or a reaction initiator. By increasing pressure to or above the critical level at which the ionizable component becomes ionized, a reaction can proceed or can be initiated. In the case of an ionizable reactant or catalyst, dropping the pressure in the reaction vessel to a pressure below the critical pressure stops the reaction. Because pressure can be dropped very quickly, a reaction can be stopped very quickly and without significant residual activity. The pressure switch allows very rapid control of reactions in a suitable vessel; pressure can be changed at the speed of sound. By contrast, other means of controlling reaction rates (e.g., by changes in temperature) are relatively slow and difficult to achieve in large scale reactor vessels.

Reactions which can be regulated by pressure in a water in supercritical $CO_2$ microemulsion reaction environment include, without limitation, acid- and base-catalyzed reactions; reactions (e.g., polymerizations) which proceed through ionic intermediates; polymerization reactions with ionic initiators and/or cross-linkers; other reactions in which at least one reactant is sufficiently polar so as to be insoluble in $CO_2$/surfactant emulsion systems except in the water core; and reactions in which a catalyst, especially a metal catalyst, is insoluble in supercritical $CO_2$/surfactant systems except in the water core of the micelles. Specific examples of monomers for which polymerization proceeds through a cationic intermediate include, but are not limited to, cyclohexyl vinyl ether, 1,4-cyclohexanedimethanol divinyl ether, hydroxybutyl ether, n-butyl vinyl ether, ethyl vinyl ether, triethyleneglycol divinyl ether, n-octadecyl vinyl ether, 1,6-hexanediol divinyl ether, tripropyleneglycol divinyl ether, dipropyleneglycol divinyl ether, 2-ethylhexyl vinyl ether and cyclohexanedimethanol monovinyl ether. For the initiation of the foregoing polymerizations, photoinitiator compounds include 2-ethyl p- (N,N-dimethylamino)benzoate or UV9310C, in which the active ingredient is bis(4-doceyl phenyl)iodonium hexafluoroantimonate; UV9310C is commercially available from GE Silicone. Photosensitizers for the cationic intermediate polymerization reactions started with a photoinitiator include anthracene, 9-vinylanthracene, 9,10-diphenylanthracene and 9,10-dimethylanthracene.

An additional specific example of a reaction carried out in the water in a supercritical carbon dioxide microemulsion as described herein is the hydrolysis of titanium isopropoxide (or titanium ethoxide, a titanium propoxide, a titanium butoxide and/or the like) to yield titanium dioxide and the corresponding alkyl alcohol (isopropyl alcohol, ethyl alcohol, propyl alcohol, butyl alcohol, and the like). The alcohol formed by the hydrolysis of the titanium alkoxide is soluble in the continuous carbon dioxide phase and the titanium dioxide remains in the water core of the micelles.

Reduction in pressure in the system results in the formation of uniformly fine precipitated particles of titanium dioxide, with the side benefit of the drying of the particles.

Figure 1:
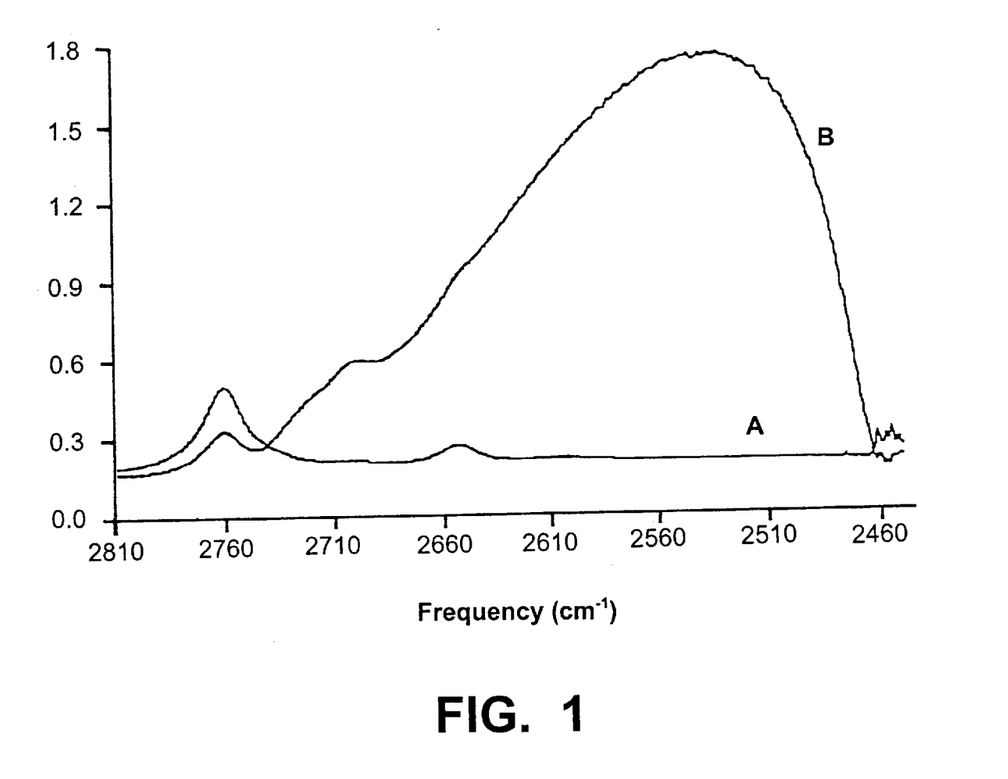
FIG. 1 provides the FTIR spectra of $D_2O$ in $CO_2$ without (trace A) and with (trace B) the addition of PFPE surfactant at 31° C. and 162 bar, $W_0=20$ (uncorrected). The IR bands of $CO_2$ have been removed by computer subtraction.

DETAILED DESCRIPTION OF THE INVENTION

The properties of $CO_2$ are much different from those of water or nonpolar organic solvents. Unlike water, $CO_2$ has no dipole moment. Even when highly compressed, $CO_2$ has far weaker van der Waals forces than hydrocarbon solvents, making it more like a fluorocarbon or fluoroether. Because of its weak solvent strength, either lipophilic or hydrophilic phases are often insoluble in liquid $CO_2$. It is desirable to form dispersions of either hydrophilic or lipophilic phases in a $CO_2$-continuous phase. Such dispersions can be stabilized with surfactants containing "$CO_2$ philic" tails, such as fluorinated compounds. Recently, an organic latex, polymethylmethacrylate, has been synthesized in $CO_2$ with a fluorocarbon stabilizer, demonstrating the ability to disperse an organic phase (2). However, techniques for the dispersion of water into $CO_2$ as a microemulsion have been elusive, despite attempts with more than 150 surfactants in several laboratories during the last decade (6,7).

Surfactants for conventional water-in-oil microemulsions have been described, including those for supercritical fluid alkane solvents (8–10). However, little has been published about designing surfactants with the proper balance of molecular interactions for the $CO_2$-water interface. The extraction of a moderately polar interfacially active dye, thymol blue, into reverse micelles in $CO_2$ with a newly synthesized fluorinated sulfosuccinate surfactant has been described (11). The amount of water, if any, present in the micelles was unknown, because the dye is soluble in water-free reverse micelles (12). In contrast to thymol blue, proteins are not soluble unless the reverse micelle cores are swollen with water to form microemulsion droplets. Recently, Harrison et al. (13) showed enhanced dissolution of water into $CO_2$ with a fluorocarbon-hydrocarbon hybrid surfactant. However, the nature of the water was not studied, because the surfactant was rapidly hydrolyzed (13). As used herein, micelles or reverse micelles refer to the tiny droplets of aqueous phase, preferably stabilized by a surfactant with a hydrophilic headgroup and a $CO_2$-philic tail, within the continuous supercritical $CO_2$ phase.

The term closed system refers to the system in which the water-in-supercritical $CO_2$ microemulsion is placed. Its closed nature allows control of pressure (and temperature) within the system.

Extremely few lipophilic or hydrophilic surfactants are soluble in $CO_2$. The surfactants used in the present invention are active at the fluorocarbon-water interface (and have been used in blood substitutes) given that the weak van der Waals forces of $CO_2$ match those of the fluorocarbons. The exemplified surfactant is an ammonium carboxylate perfluoropolyether (PFPE) surfactant, $CF_3O(CF_2CF(CF_3)O)_3CF_2COO^-NH_4^+$, (14). PFPE is commercially available in the COOH form (DuPont) and has an average molecular weight of 740. PFPE carboxylate surfactants with molecular weights from 2500 to 7500 are soluble in $CO_2$ at pressures below 300 bar (15), but their abilities to form microemulsions have not been reported. The biological inertness of PFPE surfactants complements the nontoxic nature of $CO_2$.

While specific teachings are provided herein for a particular suitable surfactant, namely PFPE, other surfactants meeting the criteria set forth herein can be used for stabilizing water core micelles in supercritical $CO_2$. With the exemplified PFPE surfactant, the density of the $CO_2$ is a key variable controlled by the pressure within the reaction chamber. The size of the water core limits the size of the monomer pool in a polymerization reaction and thus, the size of the polymer molecule formed. Sufficient water will be present within the micelle to allow ionization of monomer, catalyst, etc., when the density of the carbon dioxide is greater than about 13 moles/liter and up to about 17 moles/liter, preferably from 12.5 to 13.5 moles/liter, and more preferably from about 12.8 to about 13.2 moles/liter. Pressure can be regulated within the chamber, using, e.g., a reciprocating pump and a $CO_2$ source such as a tank of compressed carbon dioxide. The water cores of the present water-in-supercritical carbon dioxide microemulsions wherein the carbon dioxide density is about 13 moles/liter, contain about 2000–4000 water molecules per micelle. This relatively small number of water molecules per micelle responds dramatically to pressure within the reaction chamber. Because pressure can be increased or decreased very quickly, reactions can be started or stopped with a high degree of precision and without "tailing" of continued reaction. Thus, the present methods of pressure-regulated polymerization allow the creation of low molecular weight, but highly cross-linked polymers. In the exemplified PFPE surfactant stabilized system, the carbon dioxide density of about 13 moles/liter corresponds to a pressure of about 75 bars at a temperature of 35° C.

The polymers and nanocomposites made in the present methods are useful in the dental industry as high strength fillers, in chromatography as solid supports, in the pharmaceutical industry as vehicles for controlled drug delivery, and in other industrial applications including pigments, paints, and film coatings, among others.

The present invention is distinguished from that of U.S. Pat. No. 5,312,882, DeSimone et al., issued May 17, 1994, in several ways. First, the present invention provides reactions carried out in the aqueous cores of the micelles, the reactants (and/or catalyst and/or reaction initiator) are hydrophilic and ionizable, and the amount of water in the micellar cores is regulated by the pressure and/or the $CO_2$ density. By contrast, the DeSimone patent teaches a hydrophobic monomer for polymerization as one aspect of the invention and it does not teach any aqueous phase in the system.

To prepare a microemulsion, water was added to a 1.4 wt % solution of PFPE in $CO_2$, yielding a water concentration of 0.48 wt %. Phase boundaries were determined for a given solution of constant composition with a 28-ml stainless-steel variable-volume view cell containing a sapphire window (10). At high pressures, single-phase microemulsions are optically transparent. As the pressure is lowered at constant temperature, the loss in density and hence "solvent strength" of $CO_2$ causes the solution to become turbid. Table 1 lists the cloud-point pressure and corresponding pure $CO_2$ density as a function of temperature. The number of moles of water-to-surfactant, $W_0$, is calculated by subtracting the independently known amount of water soluble in pure $CO_2$ without surfactant from the total amount of water. The total number of moles of water per mole of surfactant was 14 for all temperatures. A $W_0$ of 10 suggests that some type of aggregated water domain is present, because a single surfactant molecule would not be hydrated by so many water molecules. This level of solubilization of water is unprecedented. To show that such a domain truly exists and to characterize its nature, the results of four different spectroscopic analyses are presented herein.

Fourier transform infrared (FTIR) spectroscopy has been used to characterize water environments in microemulsions, specifically interfacial "bound" water close to the surfactant head groups, and "bulk-like" water in the droplet core (16). $D_2O$ is used in FTIR spectroscopy because the O—H stretching bands are obscured by $CO_2$ and PFPE absorptions (17). The microemulsion solutions were prepared in a miniature stainless steel spectroscopic cell (2.8 mm path length) with $CaF_2$ windows (10 mm thick) (17). The PFPE/$D_2O$/$CO_2$ mixtures were prepared at 31° C. at similar conditions as the phase behavior measurements described herein. The IR spectra were recorded on a Nicolet 730 interferometer with an MCT detector (2 cm$^{-1}$ resolution). FIG. 1 shows the asymmetric and symmetric bands for free $D_2O$ dispersed in a saturated solution of $CO_2$ (trace A, 2761 and 2653 cm$^{-1}$). A dramatic effect is seen upon addition of PFPE to the solution (trace B) with the appearance of a large broad band centered at 2535 cm$^{-1}$. This low frequency broad band can be assigned to highly hydrogen bonded water in the microemulsion core because the O—H (or O—D) stretching frequency is known to decrease in proportion to the hydrogen bond energy. The O—D stretching frequency approaches that of pure bulk $D_2O$ at ~ 2500 cm$^{-1}$. The second water environment in the microemulsion structure, interfacial water, is assigned to the shoulder at 2697 cm$^{-1}$ (trace B). This intermediate frequency, between those of free and bulklike $D_2O$, might be expected from the more strained interfacial environment for hydrogen bond formation.

Figure 2:
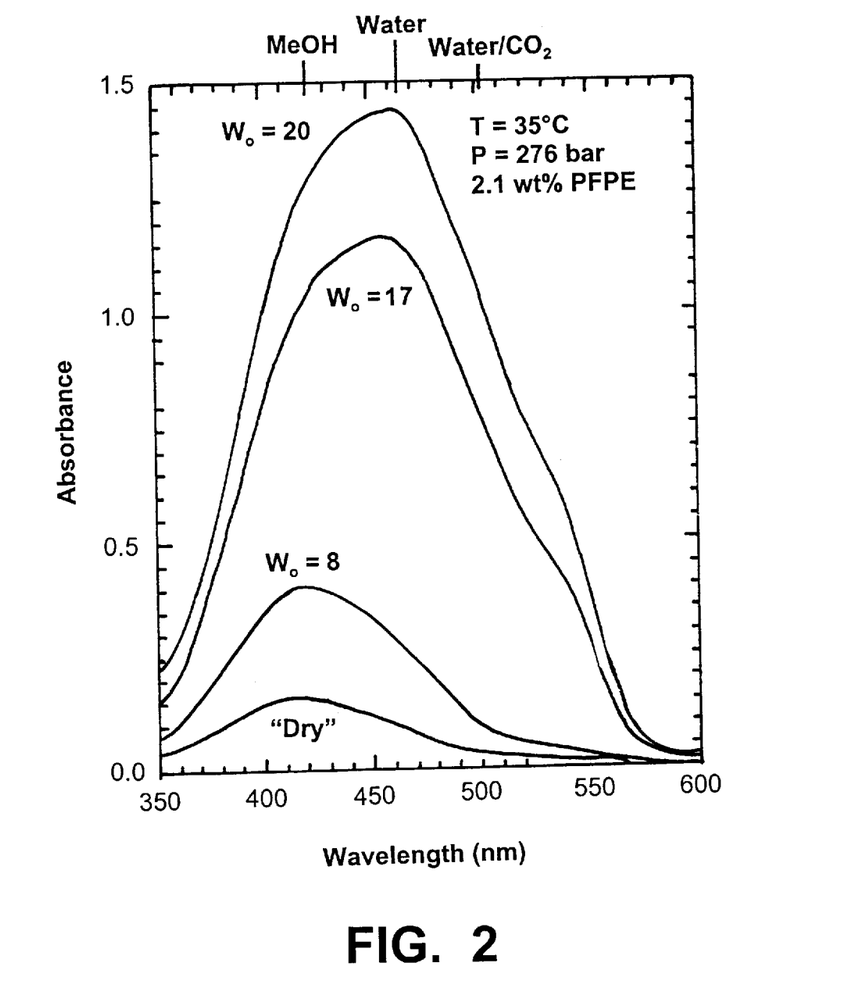
FIG. 2 illustrates absorbance of methyl orange versus wavelength in the PFPE/$CO_2$ system as a function of added water.

Spectral shifts are measured with the spectroscopic probe methyl orange [$(CH_3)_2NC_6H_4N=NC_6H_4SO_3Na$]. As the local environment of the probe becomes more polar, the absorbance maximum $\lambda_{max}$ shifts to longer wavelengths. Methyl orange in methanol is introduced into a stainless-steel cell with two sapphire windows, and the solvent is fully evaporated. The PFPE surfactant (0.026M) and various amounts of water are loaded into the cell. The spectra obtained at 276 bar are shown in FIG. 2 for various values of $W_0$. Benchmarks are placed at the top border of the figure for $\lambda_{max}$ of (surfactant-free) solvents including methanol (421 nm), water (464 nm), and aqueous carbonic acid (502 nm). As $W_0$ increases, there is a pronounced shift in $\lambda_{max}$ indicating that methyl orange resides in a highly polar aqueous environment. This result confirms the existence of "bulk-like" water seen with FTIR spectra. The shoulder in the spectra at 540 nm indicates the presence of an acidic environment due to carbonic acid.

Given a stable aqueous environment within $CO_2$, solubilization of a model protein, acrylodan-labeled bovine serum albumin (BSA-Ac) is now examined. (18, 19). This particular system is chosen because BSA is moderately large (67,000 daltons) and the strong Ac fluorescence provides a measure of both BSA conformation and concentration in solution (20). Experiments are conducted with stirred high pressure optical cells and equipment described previously (20). Excitation was at 360 nm, and excitation and emission bandpasses were 8 nm. The PFPE concentration was always 1.4wt % as in the phase equilibria measurements. BSA-Ac was added as a solid to produce a concentration of 100 nM (6.7 μg/ml) based on the volume of the cell. Water was added with a micropipet prior charging with $CO_2$. There was essentially no detectable residual emission of pure supercritical $CO_2$. Weak fluorescence at ~390 nm was observed in a binary mixture of $CO_2$ and water (FIG. 3A) With the addition of PFPE to form a microemulsion ($W_0$=9) the BSA-Ac dissolves and the emission is substantial (FIG. 3B, —). For comparison, we show spectra of native BSA-Ac (19, 21) (———), and BSA-Ac in bis(2-ethylhexyl) sodium sulfosuccinate (AOT) water-in-oil microemulsions formed in liquid n-heptane at $W_0$=20 (—. .—) (21). For convenience, each spectrum is normalized to the maximum of the BSA-Ac/PFPE/water/$CO_2$ fluorescence.

Figure 3A:
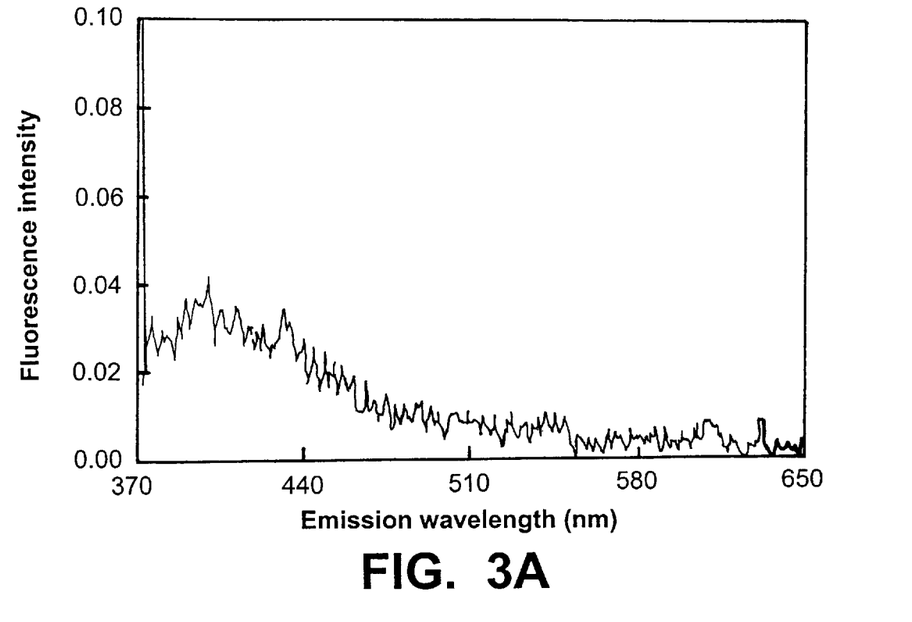
FIG. 3A illustrates fluorescent emission of BSA-Ac in $CO_2$/water and FIG. 3B illustrates the fluorescent emission of BSA-Ac encapsulated in a PFPE stabilized water-in-$CO_2$ microemulsion.
Figure 3B:
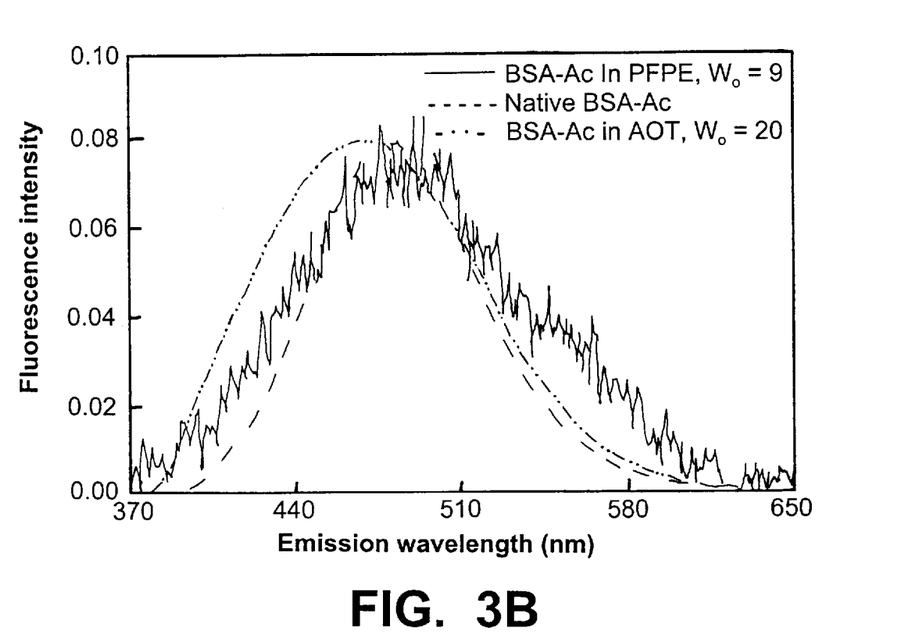

The blue-shifted emission band in FIG. 3A relative to native BSA-Ac (FIG. 3B, ---) is consistent with a small amount of BSA-Ac suspended into wet $CO_2$, and with an Ac residue experiencing a nonpolar environment. Exposure of the Ac residue to $CO_2$ indicates a conformational change in the suspended BSA. Upon forming a water-in-$CO_2$ microemulsion with PFPE, the BSA-Ac fluorescence is very strong and is similar to that of native BSA-Ac in buffer at pH 7.0. After recovery, the BSA-Ac is still recognized by the anti-BSA antibody. Together these results show that BSA-Ac is solubilized within the aqueous microemulsion droplets in an environment similar to that of bulk buffered water and remains biologically active. By contrast, BSA-Ac in AOT microemulsions at high water loadings (FIG. 3B, —.———.—) is conformationally altered with respect to native BSA-Ac. Finally, it is estimated that about 9% of the total BSA-Ac is encapsulated within the PFPE microemulsion droplets. This estimate is derived from a calibration based on BSA-Ac in liquid water. It should be considered a lower limit as the Ac quantum yield within microemulsions at all $W_0$ is somewhat less than that in liquid water (21). The remainder of the BSA-Ac is likely at the bottom of the vessel.

Figure 4:
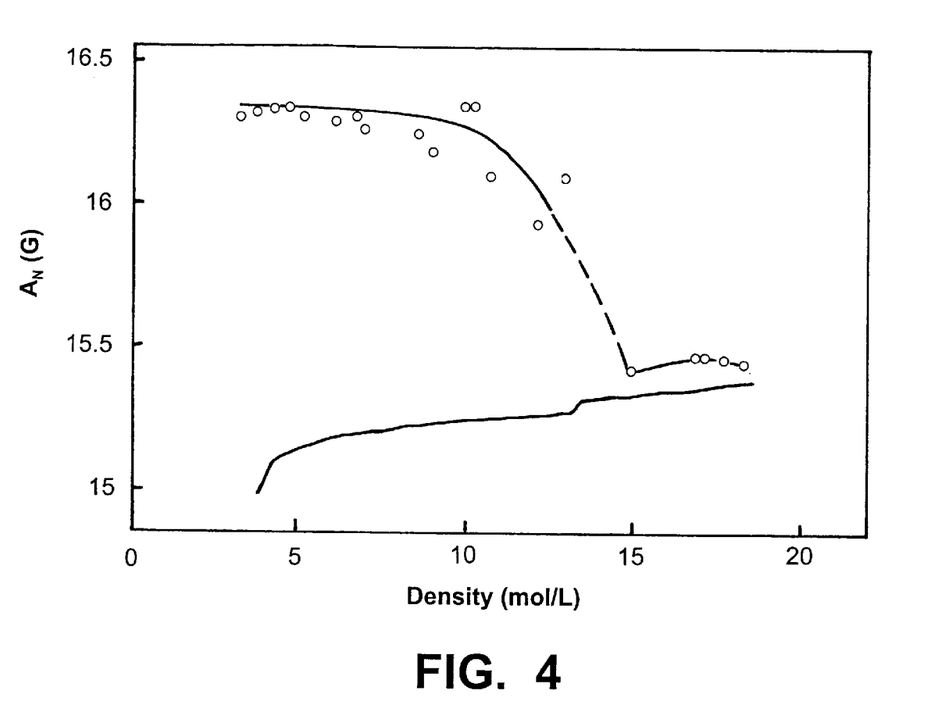
FIG. 4 illustrates nitrogen hyperfine splitting constants ($A_N$) for 4-hydroxy-TEMPO in $CO_2$ at 35° C. Thick line: water-saturated $CO_2$ with no added surfactant. Points: PFPE stabilized water-in-$CO_2$ microemulsion ($W_0=14$). For comparison, $A_N$ in water is 17.05 G.

X-band electron paramagnetic resonance (EPR) of 4-hydroxy 2,2,6,6-tetramethyl piperidino-1-oxy(4-hydroxy-TEMPO) was used to probe the local environment of the PFPE assemblies. The water to 4-hydroxy TEMPO molar ration was ~1700:1. Spectra were recorded in a high-pressure recirculating cell (22) at a microwave power of 10 mW, modulation frequency of 100 kHz, and a 1.0 G modulation amplitude. At low $CO_2$ density (<13M), nitrogen hyperfine splitting constants (called $A_N$) for 4-hydroxy-TEMPO in $CO_2$ solutions containing water and PFPE are much higher than those in $CO_2$ alone, indicating a local environment around the probe that is much more polar than pure $CO_2$ (FIG. 4). The EPR spectral shapes reflect highly anisotropic motion, as evidenced by the diminished high-field peak. Both the splitting constants and spectral shapes show that PFPE is present as an organized assembly. In contrast, the motion of the probe in water-saturated $CO_2$ (without surfactant) is isotropic.

At $CO_2$ densities >13M, the apparent $A_N$ in the surfactant solution drops to near that in neat $CO_2$. Thus, the observed $A_N$ predominantly results from 4-hydroxy-TEMPO molecules found outside of the microemulsion droplets, consistent with the shapes of the spectra. This drop in $A_N$ is not the result of a loss of polar environment, but rather results from the surprising and rapid reduction of the nitroxide by reaction with $NH_4+$ within the polar microemulsion core. The reduction in dense $CO_2$-surfactant solutions follows pseudo first-order kinetics with an apparent rate constant, k=6.8× $10^{-4}s^{-1}$. For comparison, k is $2.0×10^{-5}s^{-1}$ for solutions of 4-hydroxy TEMPO in trifluoroacetic acid and ammonium acetate, pH 3.0. The dramatic enhancement of reduction rate constant is attributed, in part, to a high degree of nitroxide orientation in the restricted environment of the microemulsion core. The strong sensitivity of the reaction rate to $CO_2$ density is due to the requirement that a water pool be present before significant ionization and subsequent reduction reaction can occur.

The FTIR, ultraviolet-visible absorbance, fluorescence and EPR data confirm the existence of an aqueous domain in $CO_2$ with a polarity approaching that of bulk water. Thus, not only do PFPE-based microemulsions offer a thermodynamically stable aqueous domain in a $CO_2$ phase, but they simultaneously offer a microenvironment that does not significantly alter the conformation of sequestered proteins. The successful formation of a microemulsion with PFPE is attributed to the weak van der Waals forces of the surfactant tail, the strong tendency of the ionic head group to leave $CO_2$, the $CF_3$ branching and the small size of the head group which favor bending of the interface about water, and the low solubility of the fluoroether tails in water. Given these guidelines, the skilled artisan can synthesize additional surfactants for new environmentally benign applications in dense $CO_2$.

For the polymerization of cyclohexyl vinyl ether, a mixture of 1.0 mM PFPE perfluoroether surfactant, 15 mM $H_2O$, 0.1 mM anthracene, 0.05 wt % UV9310C (GE Silicone), 0.5% cyclohexyl vinyl ether is placed in a pressurizable chamber such as that described hereinabove, and $CO_2$ is then pumped into the chamber to a pressure of 80 bars at 35° C. This pressure allows the incorporation of sufficient water molecules into the cores of the micelles so that the cyclohexyl vinyl ether monomers are ionized, and the reaction can proceed, in the presence of ultraviolet light, for example, from a broad-band mercury light.

Experiments were carried out to determine whether an ionic head group was necessary for a reaction to be run in the reverse micelle system. A surfactant was synthesized that contained the nitroxide, which formerly acted as a probe, as the head group instead of the ammonium ion. Typically 5 mmol of Tempol was dissolved in 10 ml absolute ether in a 100 ml flask over an ice bath with constant stirring, 6 mmol of triethylamine (TEA) and 6 mmol of pentadecafluorooctanoyl chloride were added, the ice bath was removed and the solution was stirred for two hours. Vacuum filtration was used to remove the TEA HCl salt, the solvent was evaporated and a red, waxy substance remained. The compound was purified using column chromatography with chloroform as the solvent. Typical yields were 80–85%.

Figure 5:
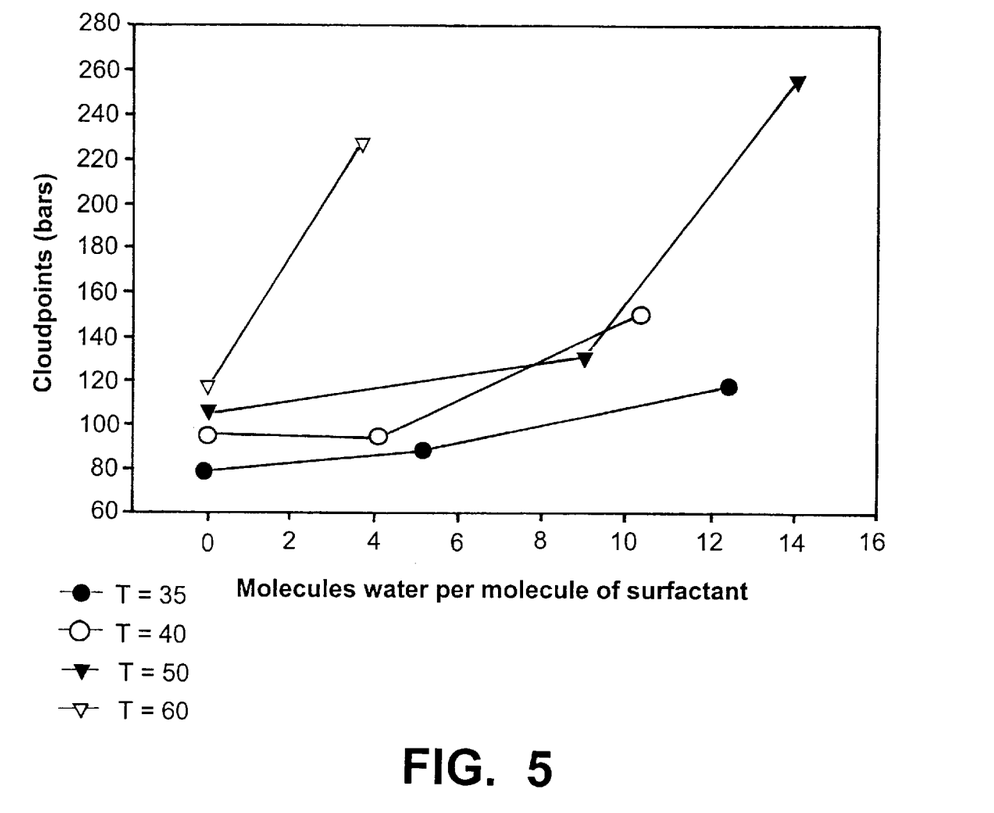
FIG. 5 illustrates cloudpoints (in bars) as a function of water loading (as molecules of water per molecule of surfactant) at various temperatures.

The solubility of this spin labeled surfactant was established in supercritical carbon dioxide. FIG. 5 shows the solubility of the surfactant at a concentration of 0.006M at three different temperatures. It was then determined that the compound did form reverse micelles in supercritical carbon dioxide. Water loadings for 0.006M surfactant were ascertained at four different temperatures, and it was found that the surfactant was able to take up significant amounts of water in supercritical carbon dioxide. Finally, the reduction of the nitroxide was investigated through electron paramagnetic resonance. It was found that when the nitroxide acted as the head group rather than as a probe, the EPR active compound was not reduced to an inactive compound, as seen in the earlier study. EPR scans showed no loss of signal with time, at all pressures tested. Therefore, an ionic head group, such as the ammonium headgroup is required for the pressure switch to work.

All references cited in the present application are hereby incorporated by reference in their entirety. The specific examples provided herein are for illustrative purposes and are not intended to limit the scope of the invention as claimed herein. Any variations in the exemplified methods which occur to the skilled artisan are intended to fall within the scope of the present invention.

TABLE 1

Cloud point pressure for a given temperature for a microemulsion containing 0.15 g PFPE, 0.052 g water and 10.4 g $CO_2$.

| T (°C.) | P (bar) | $CO_2$ Density (g/cc) | Wo |
|---|---|---|---|
| 35 | 116 | 0.758 | 10.2 |
| 40 | 131 | 0.745 | 9.1 |
| 45 | 142 | 0.725 | 8.5 |
| 50 | 153 | 0.708 | 7.9 |
| 60 | 174 | 0.674 | 5.6 |

References Cited:
1. J. M. DeSimone, Z. Guan, C. S. Elsbernd, *Science* 257:945 (1992).
2. J. M. DeSimone et al., *Science* 265:356 (1994).
3. F. A. Adamsky and E. J. Beckman, *Macromolecules* 27:312 (1994).
4. D. J. Dixon, R. A. Bodmeier, K. P. Johnston, *AIChE J.* 39:127 (1993).
5. P. G. Jessop, T. Ikariya, R. Noyori, *Nature* 368:231 (1994).
6. K. A. Consani and R. D. Smith, *J. Supercritical Fluids* 3:51 (1990).
7. A. Iezzi, R. Enick, J. Brady, ACS Symp. Ser. 406, 122 (1989).
8. F. W. Kaler, J. F. Billman, J. Fulton, R. D. Smith, *J. Phys. Chem.* 97:5661 (1991).
9. D. G. Peck and K. P. Johnston, *J. Phys. Chem.* 95:9549 (1991).
10. G. J. McFann and K. P. Johnston, *J. Phys. Chem.* 95:4889 (1991).
11. T. A. Hoefling, R. M. Enick, E. J. Beckman, *J. Phys. Chem.* 95:7127 (1991).
12. O. A. ElSeoud, A. M. Chinelatto, M. R. Shimizu, *J. Coll. Interface Sci.* 88:420 (1982).
13. K. Harrison, J. Goveas, K. P. Johnston, E. A. O'Rear, *Langmuir* 10:3536 (1994).
14. A. Chittofrati et al. *Progr. Colloid. Polym. Sci.* 79:218 (1989).
15. D. A. Newman, T. A. Hoefling, R. R. Beitle, E. J. Beckman, R. M. Enick, *J. Supercritical Fluids* 6:205 (1993).
16. G. Onori and A. Santucci, *J. Phys. Chem.* 97:5430 (1993).
17. S. M. Howdle and M. Poliakoff, in Supercritical Fluids—Fundamentals for Applications, NATO ASI Series, Applied Sciences No. 273, E. Kiran and J. J. H. Levelt-Sengers, Eds. (Kluwer Academic, Dordrecht, 1994), pp. 527–540
18. M. D. Garrison, D. J. Juliano, S. S. Saavedra, G. A. Truskey, W. M. Reichert, *J. Colloid. Interface Sci.* 148:415 (1992).
19. R. Wang, S. Sun, E. J. Bekos, F. V. Bright, *Anal. Chem.* 67:149 (1995).
20. T. A. Betts and F. V. Bright, *Appl. Spectrosc.* 44:1196 (1990)
21. J. S. Lundgren, M. P. Heitz, F. V. Bright, *Anal. Chem.* 67:3775 (1995).
22. T. W. Randolph and C. Carlier, *J. Phys. Chem.* 96:5146 (1992).

I claim:
1. A method of regulating the initiation or rate of a chemical reaction for which reaction components are present in reverse micelles of water-in-carbon dioxide emulsion in a closed system, wherein said carbon dioxide is in a super- critical fluid state in said closed system, said method comprising the step of: adjusting pressure within the closed system to a level at which sufficient water exists within reverse micelles such that a sufficient quantity of at least one ionizable reaction component is dissolved within the micelles and such that ionization of at least one component within the micelles either takes place or decreasing the pressure such that a concentration of an ionized reaction component decreases.

2. The method of claim 1 wherein at least one ionizable component is selected from the group consisting of reactants, catalysts and reaction initiators.

3. The method of claim 1 wherein the reverse micelles are stabilized in the supercritical $CO_2$ continuous phase with at least one surfactant.

4. The method of claim 3 wherein the surfactant is $CF_3O(CF_2CF(CF_3)O)_3CF_2COO^-NH_4^+$.

5. The method of claim 1 wherein the chemical reaction is a polymerization reaction.

6. The method of claim 5 wherein a monomer for the polymerization reaction is selected from the group consisting of cyclohexyl vinyl ether, 1,4-cyclohexanedimethanol divinyl ether, hydroxybutyl ether, n-butyl vinyl ether, ethyl vinyl ether, triethyleneglycol divinyl ether, n-octadecyl vinyl ether, 1,6-hexanediol divinyl ether, tripropyleneglycol divinyl ether, dipropyleneglycol divinyl ether, 2-ethylhexyl vinyl ether and cyclohexanedimethanol monovinyl ether.

7. The method of claim 5 wherein the reverse micelles further comprise a photoinitiator.

8. The method of claim 7 wherein the photoinitiator is selected from the group consisting of 2-ethyl p-(N,N-dimethylamino)benzoate and bis(4-doceylphenyl)iodonium hexafluoroantimonate.

9. The method of claim 7 wherein the reverse micelles further comprise a photosensitizer.

10. The method of claim 9 wherein the photosensitizer is selected from the group consisting of anthracene, 9-vinylanthracene, 9,10-diphenylanthracene and 9,10-dimethylanthracene.

11. The method of claim 1 wherein the chemical reaction is hydrolysis of a titanium alkoxide to yield titanium dioxide.

12. The method of claim 1 wherein a chemical reaction in the closed system is initiated when the pressure within the closed system is increased to a level sufficiently high for the ionization of at least one ionizable reaction component dissolved within said micelle within said closed system, whereby the reaction can then proceed or whereby the rate of the reaction is increased.

13. The method of claim 1 wherein the rate of a chemical reaction is slowed, said method comprising the step of decreasing pressure within the closed system in which the water-in-carbon dioxide emulsion is located, whereby an amount of at least one ionized reactant or ionized catalyst is decreased within the reverse micelles.

14. The method of claim 1 wherein a chemical reaction dependent on at least one ionized reaction component is substantially stopped by decreasing the pressure within the closed system such that the level of said ionized reaction component drops below a level at which said reaction can proceed, whereby the chemical reaction is stopped.

* * * * *

UNITED STATES PATENT AND TRADEMARK OFFICE
CERTIFICATE OF CORRECTION

PATENT NO. : 5,814,678

DATED : September 29, 1998

INVENTOR(S) : Randolph, Theodore W.

It is certified that error appears in the above-identified patent and that said Letters Patent is hereby corrected as shown below:

On the title page: Item [56]

References Cited, U.S. Patent Documents, under the second reference, Fulton et al., please add the class and subclass 210/639.

under References Cited, U.S. Patent Documents, under the third reference, DeSimone et al., please add the class and subclass 526/201.

In column 1, line 64, please delete "(——)", and replace with --(--)--.
In column 1, line 65, please delete "(____)", and replace with --(__ . . __)--.
In column 2, line 31, please delete "in a water" and replace with --in water--.
In column 5, line 58, please insert --to-- between "prior" and "charging".
In column 5, line 65, please delete "(——)", and replace with --(--)--.
In column 5, line 67, please delete "(—. .—)", and replace with --(__ . . __)--.
In column 6, line 18, please delete "(—.——.—)", and replace with --(__ . . __)--.

Signed and Sealed this

Second Day of March, 1999

Attest:

*Attesting Officer*

Q. TODD DICKINSON

*Acting Commissioner of Patents and Trademarks*

UNITED STATES PATENT AND TRADEMARK OFFICE
CERTIFICATE OF CORRECTION

PATENT NO.    : 5,814,678

DATED         : September 29, 1998

INVENTOR(S)   : Randolph

It is certified that error appears in the above-identified patent and that said Letters Patent is hereby corrected as shown below:

On the title page, please insert after "[22] Filed" Jan. 31, 1997", the following:

--           Related U.S. Application Data

[60]    Provisional Application No. 60/010,602, filed February 2, 1996.     --

Signed and Sealed this

Third Day of August, 1999

Attest:

Q. TODD DICKINSON

*Attesting Officer*       *Acting Commissioner of Patents and Trademarks*